May 27, 1947.   H. A. STAMPER   2,421,168
POSITIONING MECHANISM
Filed May 29, 1945   3 Sheets-Sheet 1

INVENTOR.
H. A. STAMPER
BY E. Woodbury
ATTORNEY

May 27, 1947.  H. A. STAMPER  2,421,168
POSITIONING MECHANISM
Filed May 29, 1945  3 Sheets-Sheet 2
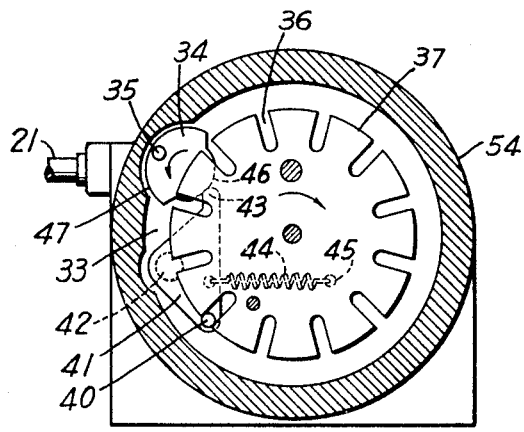
Fig. 3
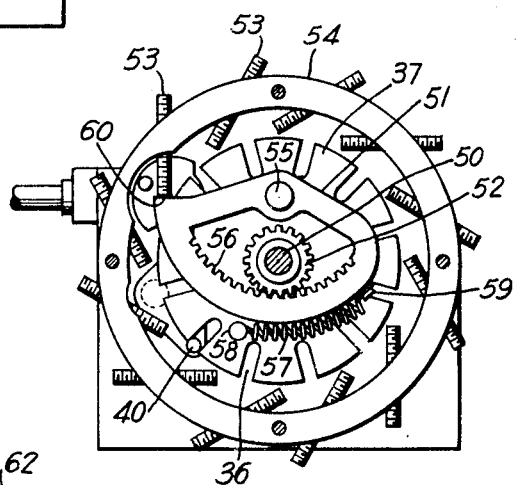
Fig. 4
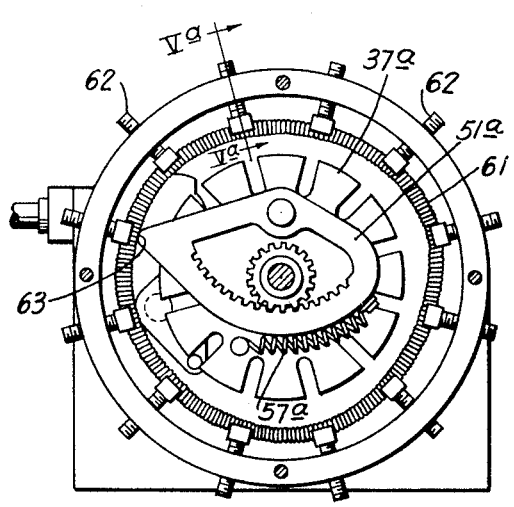
Fig. 5
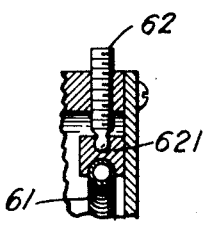
Fig. 5ª
INVENTOR.
H. A. STAMPER
BY
E. Woodbury
ATTORNEY

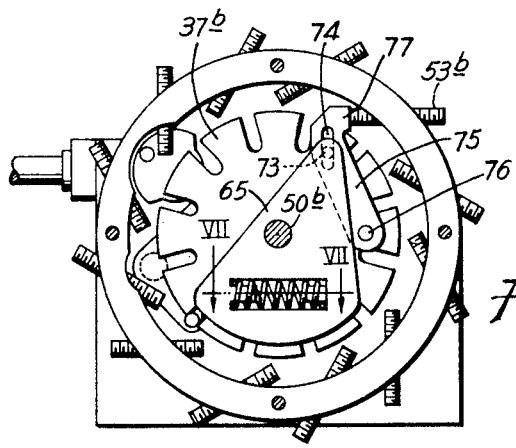
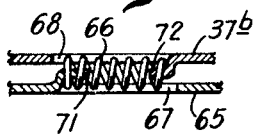
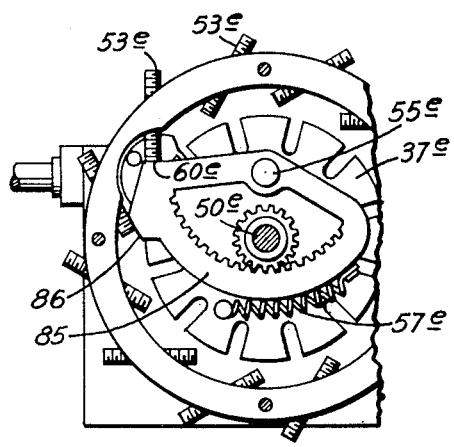
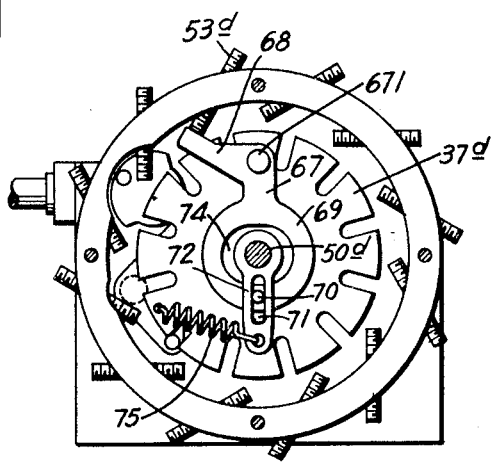
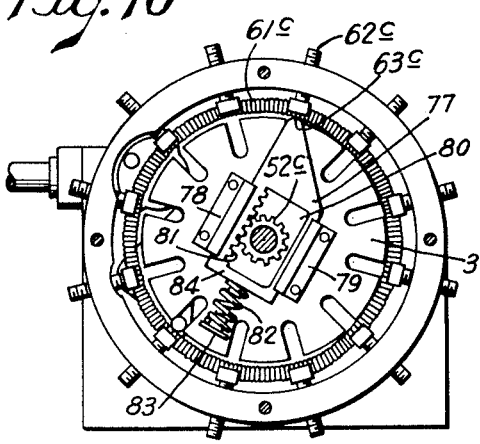
INVENTOR.
H. A. STAMPER

Patented May 27, 1947

2,421,168

UNITED STATES PATENT OFFICE 2,421,168

POSITIONING MECHANISM

Hamilton Alan Stamper, Los Angeles, Calif., assignor to Bendix Aviation Corporation, South Bend, Ind., a corporation of Delaware Application May 29, 1945, Serial No. 596,578

13 Claims. (Cl. 74—10)

1

This invention relates to positioning mechanisms for moving devices such as radio tuning condensers into preselected positions of rotation.

A broad object of the invention is to provide a practicable positioning mechanism capable of being preset to select a large number of irregularly-spaced stations.

A more specific object is to provide a multi-station positioning mechanism that:

(a) Has a wide range of adjustment for each station so that two successive stations can be either very close together or relatively far apart;

(b) Is relatively compact and mechanically simple;

(c) Is capable of accurate calibration and will retain its calibration in service;

(d) Is adaptable to many specifically different types of apparatus requiring movement of an element into preselected individually adjustable positions.

Briefly, in its preferred form, the invention comprises a rotatable driving member adapted to be rotated through and locked in any one of a plurality of positions, a driven member, and means including a compensating mechanism having adjusting elements for each position that are independently adjustable for exactly determining a different preselected position of the driven member for each of the different positions of the driving member.

The construction is such that the adjusting elements are very small and compact, permitting the assembly of a large number of them in an arc or circle around the axis of rotation of the driving and driven members, and this constitutes an important feature and advantage of the invention.

Another important feature of the invention is that the mechanism responsive to the adjusting elements is capable of producing a relatively large range of angular movement between the driving and driven members so that several successive stations or positions can be either very close together or relatively far apart, thereby making the apparatus particularly flexible and adaptable to the operation of radio tuning condensers in radio equipment for preselection of a large number of non-uniformly-spaced wave bands.

Other more specific objects and features of the invention will appear from the detailed description to follow of certain specific embodiments of the invention.

In the drawing:

Fig. 3 is a vertical section taken in the plane III—III of Fig. 2.

2

Figure 2:
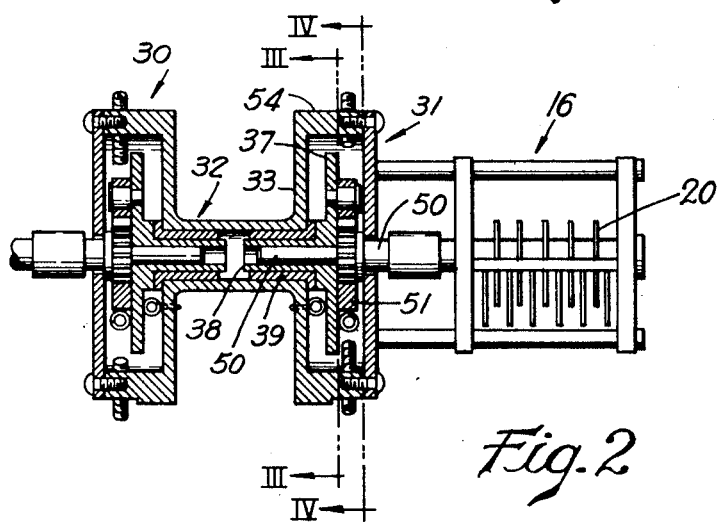
Fig. 2 is a vertical section taken along the line II—II of Fig. 1.

Fig. 4 is a vertical section taken in the plane IV—IV of Fig. 2.

Fig. 5 is a view similar to Fig. 4, but showing an alternative construction.

Fig. 5a is a detail section in the plane Va—Va of Fig. 5.

Fig. 6 is a view similar to Fig. 4, but showing another alternative construction.

Fig. 7 is a detailed section taken in the plane VII—VII of Fig. 6, and

Figs. 8, 9, and 10 are views similar to Fig. 4, but showing three other constructions alternative to those of Figs. 4, 5, and 6.

Figure 1:
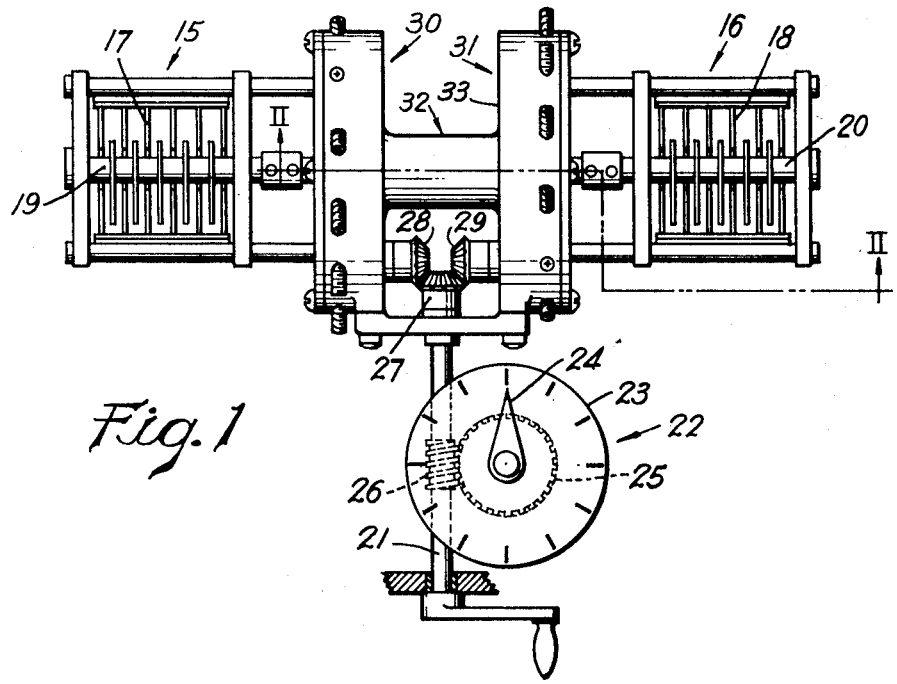
Fig. 1 is a schematic plan view showing the application of the invention to the tuning of two coordinated radio condensers.

Referring first to Fig. 1, there is shown a pair of radio condensers 15 and 16, respectively, having stators 17 and 18, respectively, and rotors 19 and 20, respectively. The two condensers 15 and 16 may be located in different portions of a radio circuit where they must be tuned to provide capacities that have a particular relation to each other, but are not necessarily identical. In accordance with the present invention, the two condensers are driven from a common control shaft but the exact setting of each condenser is adjustable independently of the other in a large number of settings. Thus, let it be assumed that the two condensers 15 and 16 are to be simultaneously tuned to any one of 12 different wave bands by rotation of a shaft 21 which drives the condensers simultaneously and also drives an indicator 22 which indicates the different bands to which the condensers are to be tuned. The indicator comprises a dial 23 having 12 positions marked thereon, and a pointer 24 which is connected to a worm wheel 25 driven by a worm 26 on the shaft 21. The shaft 21 has on its end a bevel gear 27 which simultaneously drives a pair of bevel gears 28 and 29, and they in turn drive the rotors 19 and 20 of the condensers 15 and 16 through a pair of compensating mechanisms 30 and 31 in accordance with the invention. The mechanisms 30 and 31, as shown in Fig. 2, include a common casing 32 in which the mechanisms are mounted, and since the two mechanisms are identical, only the mechanism 31 will be described.

Referring for the moment to Figs. 1 and 3, the bevel gear 29 is mounted on a shaft journaled in the wall 33 of the housing 32, and positioned on the inner end of the shaft within the housing is a cam 34 from which projects a crank pin 35 which is positioned to move into and out of slots 36 in a disc 37 which has a hollow shaft 38 extending from one face thereof and rotatably supported in a bearing 39 in the housing 32. The disc 37 has 12 of the slots 36, which extend radially inwardly from the peripheral edge of the disc, are equally spaced circumferentially from each other, and correspond to the 12 positions shown on the indicator 22. The disc 37 is normally locked against rotation in either direction by a lock pin 40 on a rocker element 41 which is pivotally supported in the casing wall 33, for rocking movement about a pivot pin 42, and has a shoulder 43 which bears on the cam 34. The rocker member 41 is constantly urged counterclockwise by a tension spring 44 connected between the rocker arm and an anchor pin 45 in the wall 33, and the extent of the counterclockwise movement is determined by the position of the cam 34. Normally, the shoulder 43 of the rocker arm bears against a low portion 46 of the cam, in which position the lock pin 40 engages one of the slots 36 to hold the disc 37 against rotation in either direction. However, in response to rotation of the cam 34 (produced by rotation of the shaft 21) through one revolution a high portion 47 of the cam 34 is brought against the shoulder 43 of the rocker arm 41 to rock the latter and carry the lock pin 40 out of engagement with the slot in which it was positioned. Simultaneously, the crank pin 35 enters one of the slots 36 and, during the next half revolution of the cam, rotates the disc 37 by the distance between successive slots 36. As the pin 35 leaves the slot, the high part 47 of the cam rides out from under the shoulder 43 permitting the spring 44 to retract the rocker member 41 to carry the lock pin 40 into the next of the slots 36 and again lock the disc 37 against rotation.

It will be apparent, therefore, that by rotating the shaft 21, the disc 37 can be successively rotated into and locked in any one of 12 different angular positions equally spaced from each other, and the position of the disc 37 will, at all times, correspond to the position of the indicator 24. It may be assumed that the 12 positions described correspond to 12 different wave bands to which the condensers 15 and 16 are to be tuned, but the 12 wave bands are not necessarily spaced equidistant from each other in the frequency range. However, each disc 37 drives the rotor of its associated condenser through a mechanism, next to be described, which permits independent adjustment of the position of the condenser rotor in each of the 12 positions, to properly tune it to the desired frequency in each position.

Thus, referring to Figs. 2 and 4, the disc 37 drives the shaft 50 of the condenser 16 through a rack member 51 pinned to the disc 37 and a pinion 52 on the shaft 50, and the angular position of the shaft 50 is a function not only of the angular position of the disc 37, but of the position of the rack member 51 with respect to the disc 37; and the position of the rack member 51 is independently adjustable in each of the 12 positions of the disc 37 by adjusting screws 53 which are threaded through the peripheral wall 54 of the housing 32. As clearly shown in Fig. 4, the rack member 51 is pivotally connected to the disc 37 by a pivot pin 55 at a point displaced from the center of the disc 37, and the rack member has an arcuate rack 56 which is concentric with respect to the pivot 55. The rack member is constantly urged clockwise (the direction being taken looking at Fig. 4) by a tension spring 57 connected between a pin 58 on the disc 37 and a pin 59 on the rack member.

As shown in Fig. 4, the mechanism is at rest in one of the 12 positions of adjustment. The disc 37 is locked in position by the lock pin 40 being in one of the slots 36, and the rack member 51 is urged by the spring 57 in direction to carry a shoulder 60 thereon against one of the adjusting screws 53. It will be observed that the shoulder 60 lies approximately in the plane of the axis of the pivot pin 55, and the screws 53 are arranged at such an angle that the screw in contact with the shoulder 60 at any time is substantially normal thereto. It will be apparent that by turning the screw 53 that is in contact with the shoulder 60, the rack member 51 can be rocked about its pivot pin 55, causing the rack 56 to rotate the pinion 52 to shift the position of the shaft 50 and the condenser rotor connected thereto for adjustment purposes. It is important to note that the radius of curvature of the rack 56 is substantially larger than the radius of the pinion 52 so that a given angular adjustment of the rack member 51 by one of the screws 53 produces a substantially greater angular movement of the pinion 52. This provides a large range of adjustment in each of the 12 positions of the disc 37. In fact, the range of adjustment may be substantially greater than the angular distance between successive notches 36 of the disc 37, so that the condenser can be adjusted into successive angular positions that are very close to each other or that are spaced apart angular distances substantially greater than the angular distance between successive slots 36 in the disc 37.

In practice it is found that the shaft 50 can be readily adjusted through an angle of 90° by means of each one of the screws 53, and the adjustment will remain constant in service to within .01°.

When the disc 37 is rotated to carry it into a new position, the rotation slides the shoulder 60 on the rack member 51 substantially parallel to the face of the shoulder until the latter clears the end of the screw 53, against which it was lying; thereupon the rack member is snapped clockwise about the pivot 55 by the spring 57 to carry the shoulder 60 against the end of the next adjusting screw 53. When the disc 37 has completed its movement into the next position and is locked therein by the lock pin 40, the shoulder 60 on the rack member 51 lies flat against the next adjusting screw 53, and the exact position of the rack member and of the condenser rotor that it drives can be accurately adjusted by rotating the new screw 53 against which the shoulder 60 of the rack member lies.

Initial adjustment is effected by successively rotating the disc 37 into its 12 different positions and successively adjusting the 12 screws 53, thereby fixing the exact angular position of the condenser rotor for each of the 12 positions of the disc 37.

The modified construction of Fig. 5 is identical with that of Fig. 4 except that the adjustment is effected by a flexible cam 61 supported by 12 radially adjustable screws 62, and a tip 63 on the rack member 51a bears against the inner surface of the cam 61. It will be apparent that clockwise rotation of the rack member 51a by its spring 57a is limited by contact of the tip 63 against the cam 61, and the position of the rack member in each of the 12 positions of the disc 37a can be independently adjusted by turning the screw 62 that is juxtaposed to the tip 63. The structure of Fig. 5 has the advantage over the structure of Fig. 4 that the movement of the rack member 51a is gradual as the tip 63 slides along the cam 61, whereas the rack member 51 in Fig. 4 is snapped between successive screws 53, 53. However, the structure of Fig. 5 has the disadvantage over the structure in Fig. 4 that it is not practicable to obtain as wide a range of adjustment between successive positions because of the limited flexibilities of the cam 61. The cam 61 may be a helical spring supported by shoes 621, which are pivotally mounted on the inner ends of the screws 62 as shown in Fig. 5a, each shoe having a semi-cylindrical seat for receiving the spring 61.

In the modification shown in Fig. 6, a pin and slot mechanism is provided in place of the rack and pinion mechanisms of Figs. 4 and 5. Otherwise the construction is substantially the same as in Fig. 4 and corresponding parts bear the same reference numerals with the suffix b. In Fig. 6 a plate 65, secured to the shaft 50b, is substituted for the pinion 52 of Fig. 4, and this plate is constantly urged clockwise with respect to the disc 37b by a helical spring 66 mounted in slots 67 and 68 (Fig. 7) formed in the plate 65 and the disc 37b, respectively, and compressed between a tongue 71 on the plate 65 and a tongue 72 in the disc 37b. Clockwise movement of the plate 65 with respect to the disc 37b is limited by engagement of a pin 73 projecting from the plate 65 into a slot 74 in an arm 75 that is pivotally connected at its other end by a pin 76 to the disc 37b. The arm 75 has a shoulder 77 which, in each position of the disc 37b, bears against the end of a different one of the adjusting screws 53b. It will be obvious that by adjusting the screws 53b, the arm 75 can be rocked about its pivot 76 to shift the plate 65, through the slot 74 and pin 73, and thereby effect adjustment of the plate 65 and the condenser shaft 50b. The structure of Fig. 6 is simpler than that of Fig. 4 in that it eliminates the rack and pinion connection. However, it has the disadvantage as compared to the structure of Fig. 4 that it does not provide as great a range of adjustment, since the motion-amplifying effect of the rack and pinion is lost. However, where a large range of adjustment is not required, the structure of Fig. 6 is desirable because of its simplicity.

A modification of the structure of Fig. 6 is shown in Fig. 8, the difference being in the shape and arrangement of the parts. Thus, in Fig. 8 a rocker arm 67, pivotally connected to the disc 37d by a pivot pin 671, has one end 68 extending at a suitable angle for engagement with the adjusting screws 53d and has another end 69 which extends substantially radially with respect to the disc 37d across the center thereof and is provided with a pin 70 which engages a slot 71 in an arm 72 secured to the condenser shaft 50d. The long end 69 of the arm 67 has an opening 74 through which the shaft 50d passes, so that the arm 67 can swing without interference by the shaft 50d. The arm 72 is urged clockwise by a tension spring 75, so that movement of the arm 72 and the arm 67 is limited by engagement of the end 68 of arm 67 against the adjusting screws 53d. The mechanism of Fig. 8 functions in the same general way as that of Fig. 6, but it has the advantage of providing a larger range of adjustment. Thus, an amplifying effect is produced by virtue of the fact that the distance between the pivot pin 67, and the pin 70 is substantially greater than the distance from the center of shaft 50d to the pin 70. The structure of Fig. 8, therefore, combines the advantages of the structures of Figs. 4 and 6 without resorting to the use of a rack and pinion.

The structure shown in Fig. 9 is a modification of that shown in Fig. 5 and corresponding parts bear the same reference numerals with the suffix c. Thus, it employs a flexible cam 61c and radial adjusting screws 62c. However, instead of employing a rocking rack member, the structure of Fig. 9 employs a rack member 77 adapted to move in a linear path. Thus, the rack member 77 is guided for sliding movement along the disc 37c by guides 78 and 79 and has a rectangular window 80 to provide space for the pinion 52c, which is engaged by a straight rack 81 at one edge of the window 80. The rack member 77 has a tip 63c constituting a cam follower which rides along the cam 61c, and it is urged against the cam by a compression spring 82 compressed between a shoulder 83 on the disc 37c and the rear end 84 of the rack member 80. The operation of the arrangement shown in Fig. 9 is evident. The arrangement has the advantage that it can be rotated in either direction equally well.

In all the modifications of the invention so far described with reference to Figs. 1–9 inclusive, the disc 37 is locked in position by the lock pin 40 when the device is at rest in any position, and the position of the condenser shaft 50 is a function of the exact position of the disc 37 as well as being a function of the adjusting mechanism. However, there is shown in Fig. 10 a modification of the invention in which the position of the driven shaft 50e is determined solely by the adjusting mechanism and no separate locking means for positioning the disc 37e is provided. Thus, it will be observed from inspection of Fig. 10 that the lock pin 40 of the other figures has been eliminated, but that the rack member 85 is provided with an additional shoulder 86 adapted to contact the edge of the adjusting screw 53e next adjacent to, but rearwardly displaced from, the adjusting screw 53e against which the shoulder 60e of the rack member rests. Except as noted, the structure of Fig. 10 is identical with that of Fig. 4. It will be observed that by contact of the shoulder 60e with one adjusting screw 53a and contact of the shoulder 86 against the side of the adjacent screw 53e, the positions of both the rack member 85 and the disc 37e are fixed. Thus, the spring 57e urges the rack member 85 clockwise and the disc member 37e counterclockwise. However, clockwise rotation of the rack member is prevented by contact of the shoulder 60e against the end of one adjusting screw 53e while counterclockwise rotation of the disc 37e is prevented by contact of the shoulder 86 against the other screw 53e. The shoulder 86 is concentric relative to the pivot 55e of the rack member so that contact of shoulder 86 against an adjusting screw does not tend to rotate the rack member in either direction. Furthermore, rotation of the rack member 85 by adjustment of the screw 53e that bears against the shoulder 60e does not change the position of the disc 37e, because of the fact that the shoulder 86 is concentric with respect to the pivot pin 55e. The angle of the adjusting screws 53e is preferably so chosen that they extend tangentially to the shoulder 86 when contacted thereby.

To simplify the drawings, structures have been shown that provide only 12 positions of adjustment. However, it is to be understood that in practice it is possible to employ a much larger number of positions, and an important feature of the invention is the adaptability of the structure to handle a large number of stations. In practice, structures in accordance with Fig. 4 have been made having 30 slots 36, and 30 adjusting screws 53 arranged in a circle as shown. It is possible that even a larger number of positions can be handled. It will also be apparent that it is not necessary that the members rotate through a complete revolution. Thus, in some instances, it may be desirable to provide for a relatively large number of positions distributed over an arc substantially less than a full circle. If a condenser is employed that has its complete range of adjustment lying within an arc of 180°, then the adjusting screws 53 should be arranged only over an arc of 180°.

Various other departures from the exact construction shown will be obvious to those skilled in the art and the invention is, therefore, to be limited only to the extent set forth in the appended claims.

I claim:

1. In a mechanism having a driving member and means for moving it into any one of a first set of predetermined positions and a driven member to be moved by said driving member into any one of a second set of predetermined positions, means comprising: stop means adjacent the path of movement of said driving member having a plurality of adjustable portions corresponding to said first set of predetermined positions; a compensating element mounted on said driving member for limited movement with respect thereto and having a follower adapted to successively engage said adjustable portions of said stop means as said driving member moves through said first set of predetermined positions, whereby a different portion of the stop means independently determines the position of said compensating element in each of said first set of predetermined positions; and means jointly responsive to the position of said driving member and the position of said compensating element for positioning said driven member in said second set of predetermined positions.

2. In a mechanism having a rotary driving member and means for rotating it into any one of a first set of predetermined positions and a coaxial rotary driven member to be rotated by said driving member into any one of a second set of predetermined positions, means comprising: stop means approximately concentric with respect to said driving member having a plurality of independently adjustable portions corresponding to said predetermined positions; a compensating element mounted on said driving member for limited movement with respect thereto and having a follower adapted to successively engage successive portions of said stop means as said driving member moves through said first set of predetermined positions, whereby a different portion of said stop means independently determines the position of said compensating element with respect to said driving member in each of said first set of predetermined positions; and means jointly responsive to the position of rotation of said driving member and the position of said compensating elements relative to said driving member for positioning said driven member in said second set of predetermined positions.

3. A mechanism as described in claim 2 in which said means for moving said rotary driving meber into any one of said first set of predetermined positions comprises a disc element rotatable with said driving member and having uniformly-spaced slots in its periphery, a rotary cam element having a crank pin adapted to mesh with said slots for rotating said disc element through the distance between successive slots therein in response to each revolution of said rotary cam element, a cam follower rocker element having a holding pin adapted to enter said slots to lock said disc against rotation while said crank pin is out of a slot, said cam element and follower element cooperating to rock said holding pin into a slot as said crank pin leaves a slot and to rock said holding pin out of a slot as said crank pin enters a slot.

4. In a mechanism having a rotary driving member and means for rotating it into any one of a first set of predetermined positions and a coaxial rotary driven member to be rotated into any one of a second set of predetermined positions, means comprising: stop means approximately concentric with said driving member having a plurality of adjustable portions corresponding to said predetermined positions; a compensating element oscillatably mounted on said driving member; spring means urging said oscillatable element in one direction with respect to said driving member against said stop means whereby said oscillatable element contacts a different portion of said stop means in each of said first set of predetermined positions; and means coupling said oscillatable element to said driven member whereby each of said second set of predetermined positions is jointly determined by the position of said driving member and the position of said oscillatable element on said driving member.

5. A mechanism as described in claim 4 in which said means coupling said oscillatable element to said driven member comprises: a rack on said oscillatable element, and a pinion, secured to and coaxial with said driven member, meshing with said rack.

6. A mechanism as described in claim 4 in which said oscillatable element is oscillatable in an arc about a pivotal axis eccentrically positioned on said driving member.

7. A mechanism as described in claim 4 in which said oscillatable element is oscillatable in an arc about a pivotal axis eccentrically positioned on said driving member, and said rack is a concave internal rack concentric with respect to said pivotal axis.

8. A mechanism as described in claim 4 in which said oscillatable element is pivotally supported on said driving member for oscillation through an arc about an axis eccentrically positioned on said driving member and has a shoulder for contacting said stop means lying in a plane radial with respect to said pivotal axis, said stop means comprising a plurality of discontinuous shoulders between which said shoulder on the oscillatable element snaps during movement of said driving member between successive positions.

9. A mechanism as described in claim 4 in which each of said portions of said stop means has a stop surface substantially concentric to the axis of said driving and driven members.

10. A mechanism as described in claim 4 in which said stop means comprises a circumferentially continuous cam surface, and said plurality of adjustable portions thereof are radially adjustable.

11. A mechanism as described in claim 4 in which said spring means is interposed directly between said driving and driven members, and relative movement between said driving and driven member by said spring is limited by a coupling including said oscillatable element.

12. In a mechanism having a driving member and means for moving it at least approximately into any one of a set of predetermined positions, and a driven member to be moved into positions corresponding to, but not necessarily identical with, said set of predetermined positions, means comprising: stop means adjacent the path of movement of said driving member having a plurality of adjustable portions corresponding to said predetermined positions; an oscillatable compensating element pivotally mounted on said driving member for oscillation about a pivotal axis eccentrically positioned thereon; spring means urging said oscillatable element in one direction with respect to said driving member; said oscillatable element having a first stop shoulder concentric to said pivotal axis and a second stop shoulder substantially radial with respect to said pivotal axis; said stop means including a pair of stop elements for each of said predetermined positions of said driving member, one adapted to be contacted by said concentric shoulder on said compensating element and the other adapted to be contacted by said radial shoulder of said compensating element; and means jointly responsive to the position of said driving member and the position of said compensating element relative to said driving member for positioning said driven member.

13. A mechanism as described in claim 4 in which said stop means comprises a circumferentially continuous cam member in which said plurality of adjustable portions thereof are adjustable radially and said oscillatable element is oscillatably mounted on said driving member for radial movement into contact with said cam surface and said means for positioning said driven member comprises a pinion on said driven member and a rack on said oscillatable member engaging said pinion.

HAMILTON ALAN STAMPER.

REFERENCES CITED

The following references are of record in the file of this patent:

UNITED STATES PATENTS

| Number | Name | Date |
|---|---|---|
| 1,834,272 | Enderwood | Dec. 1, 1931 |
| 1,977,397 | Morel | Oct. 16, 1934 |
| 1,747,233 | Gargan | Feb. 18, 1930 |
| 2,069,627 | Schwarzhaupt | Feb. 2, 1937 |
| 2,095,100 | Maillard | Oct. 5, 1937 |